Sept. 5, 1950   J. S. SCHEUERMANN ET AL   2,521,413
WEB TENSION CONTROL MEANS

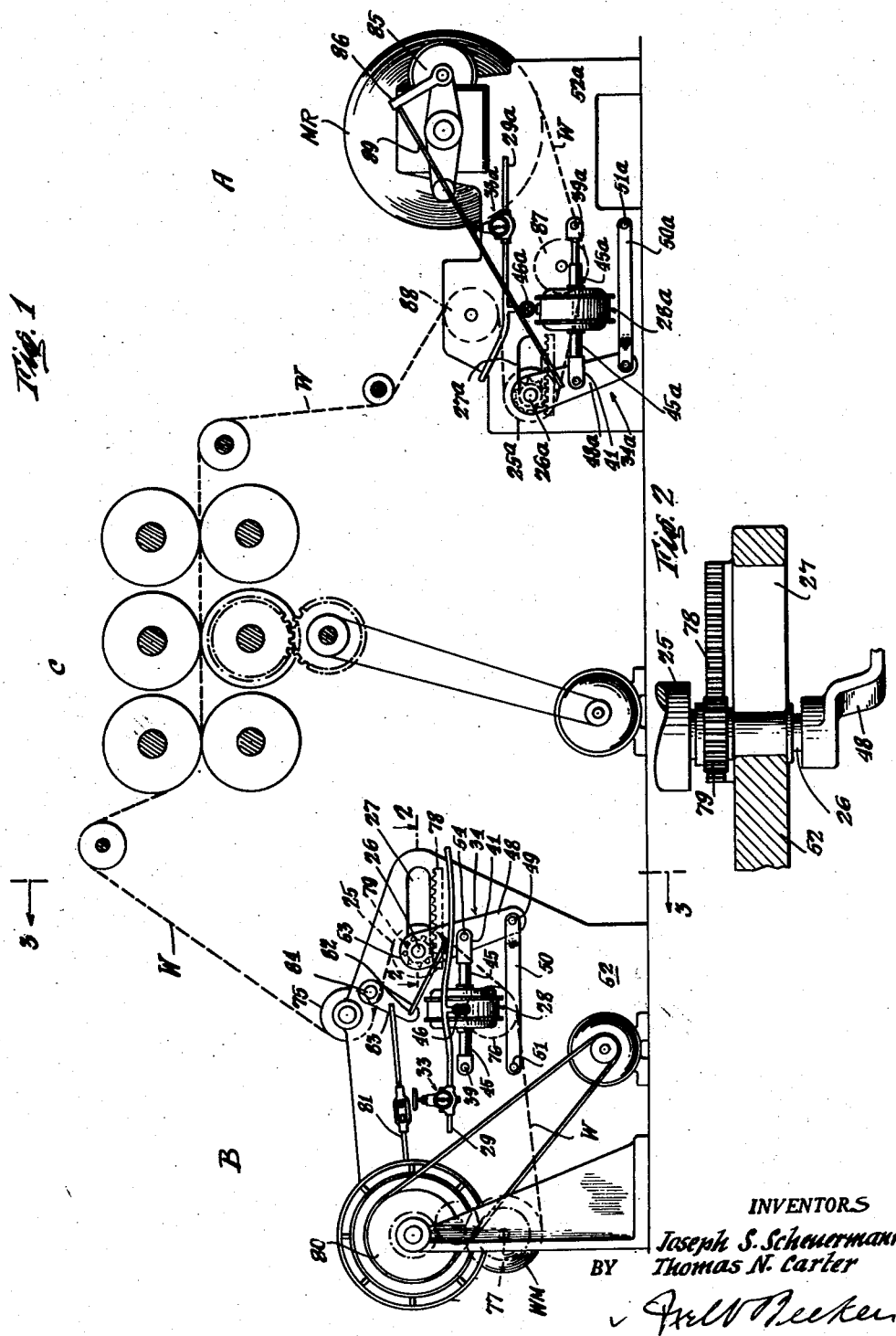
Sept. 5, 1950 — J. S. SCHEUERMANN ET AL — 2,521,413
WEB TENSION CONTROL MEANS
Filed Nov. 16, 1944 — 9 Sheets-Sheet 1
INVENTORS
Joseph S. Scheuermann
Thomas N. Carter
BY
ATTORNEY

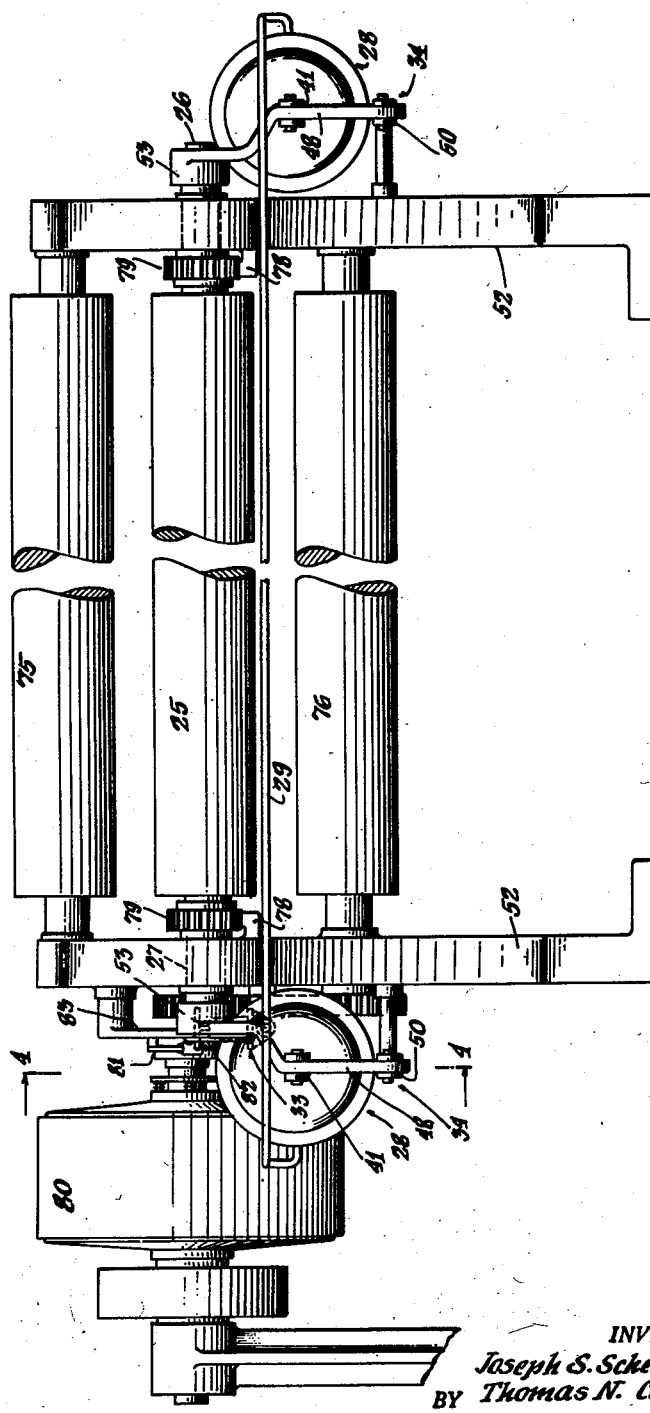

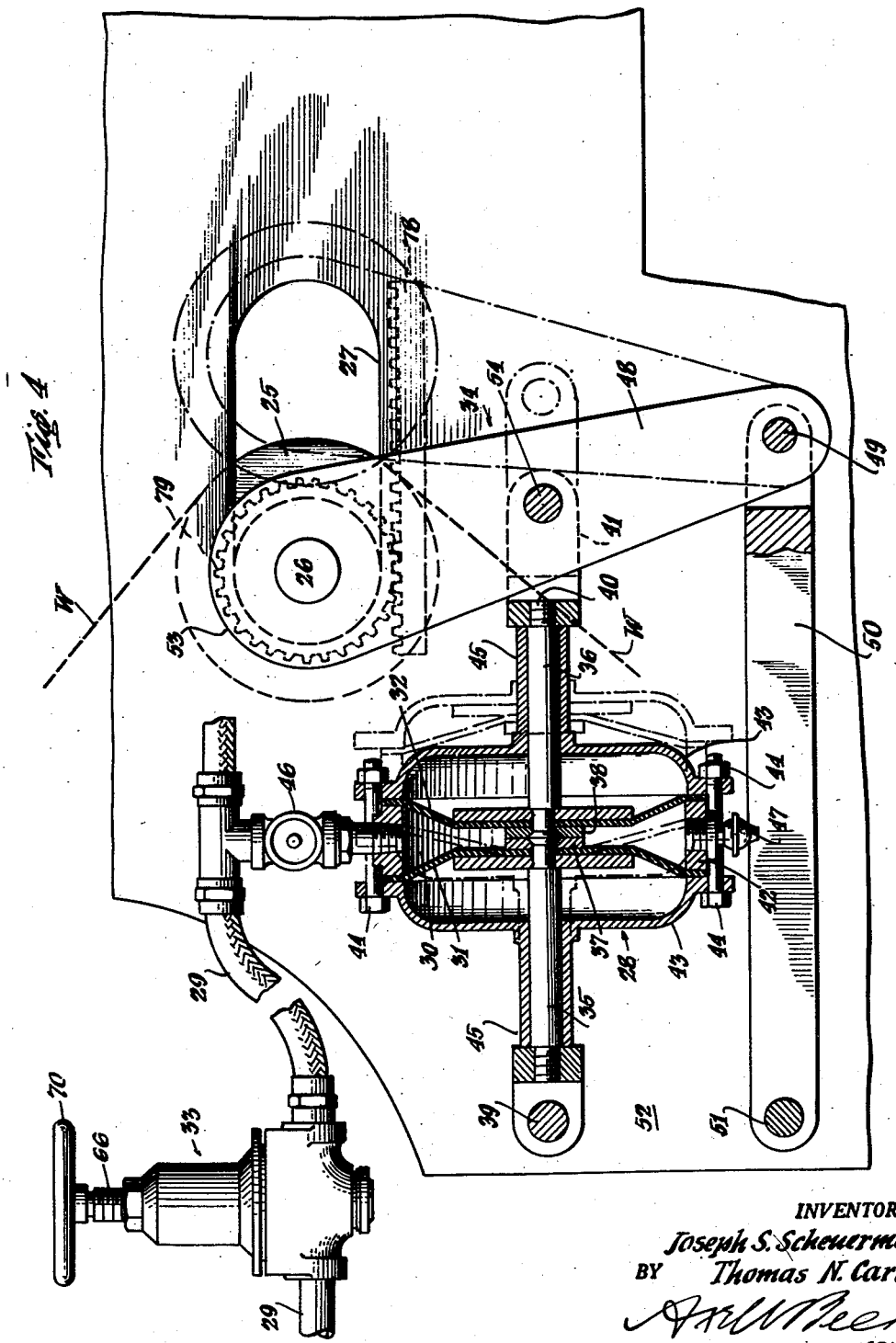

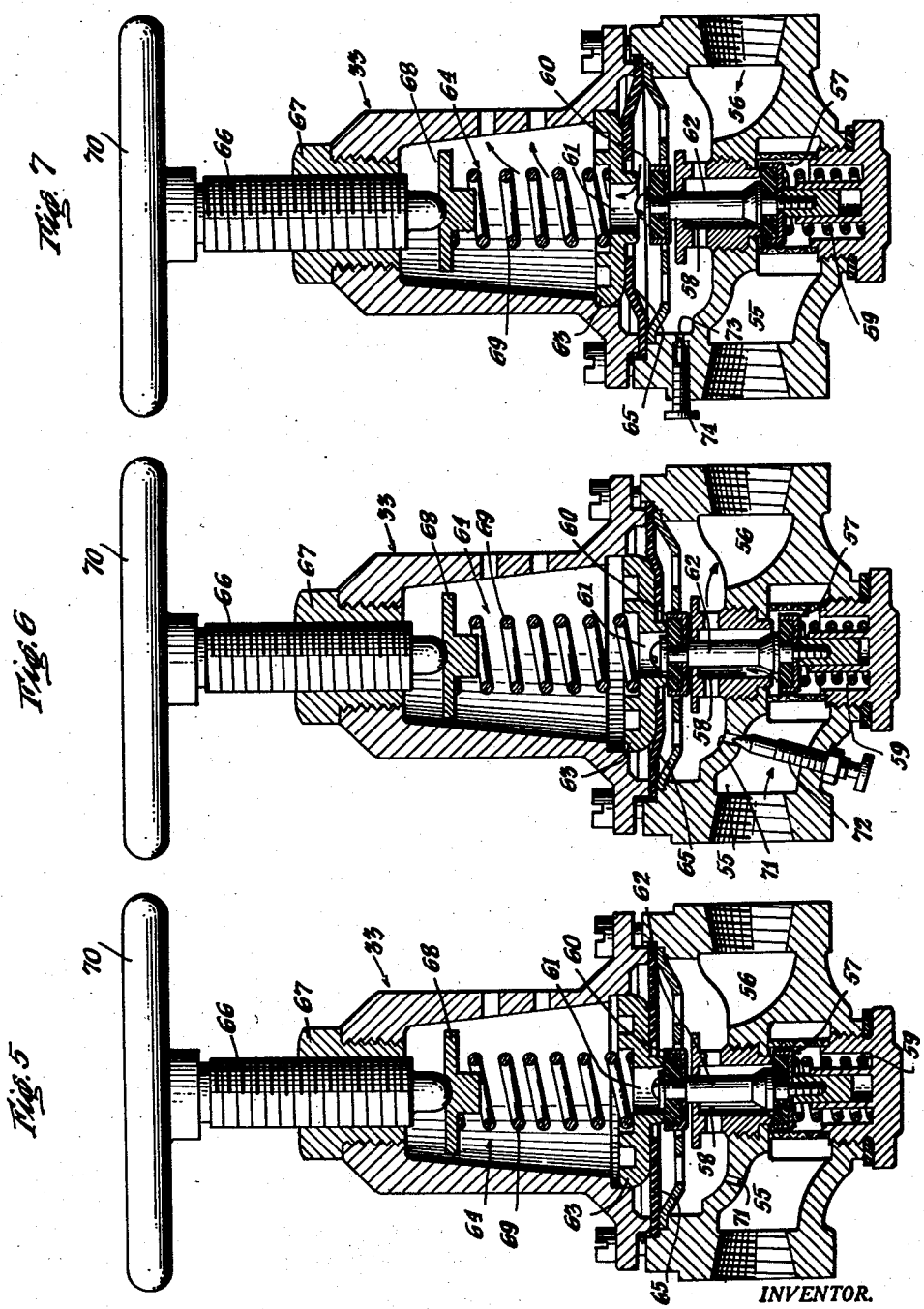

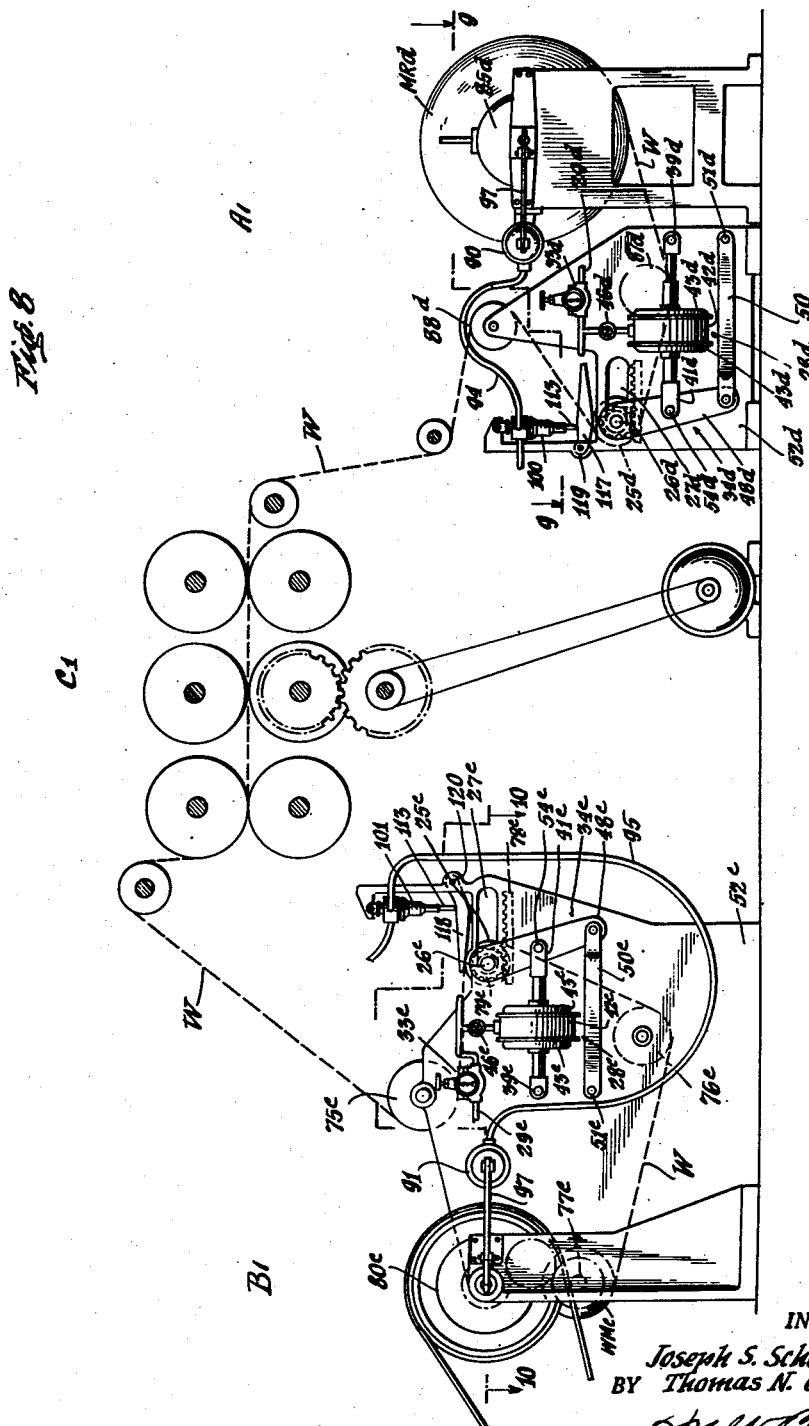

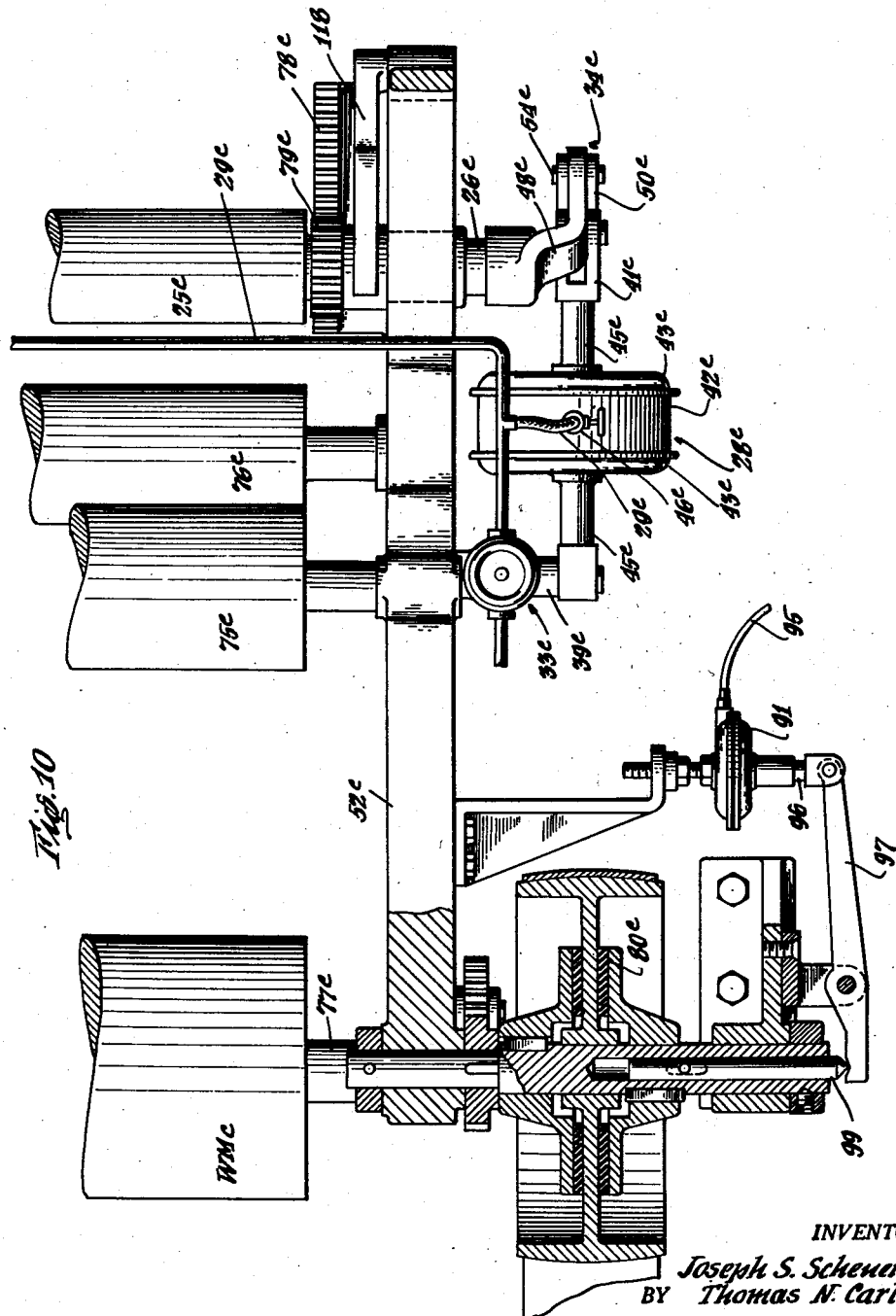

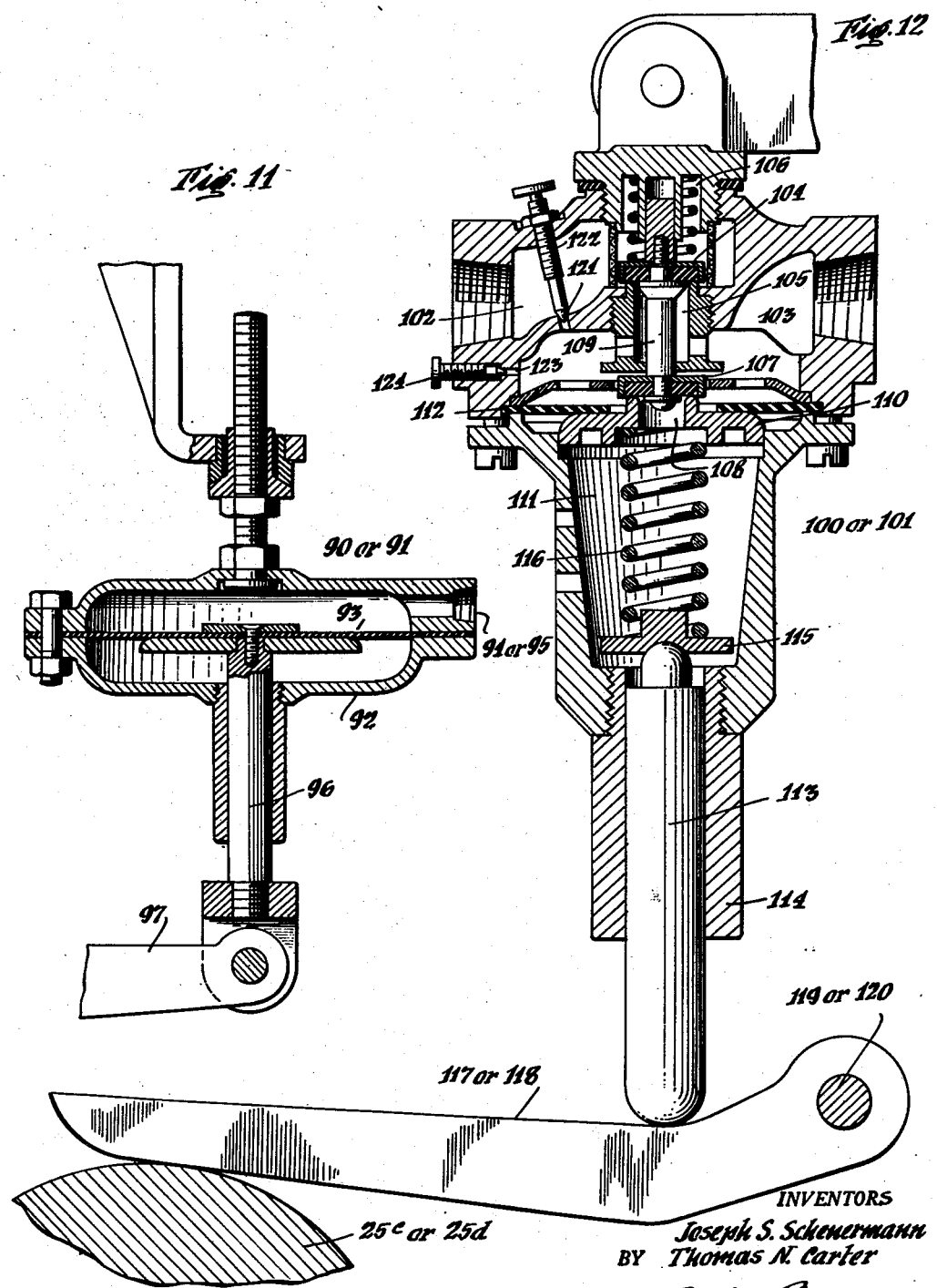

Filed Nov. 16, 1944   9 Sheets-Sheet 9

INVENTORS
Joseph S. Scheuermann
BY Thomas N. Carter

ATTORNEY

Patented Sept. 5, 1950

2,521,413

UNITED STATES PATENT OFFICE 2,521,413

WEB TENSION CONTROL MEANS

Joseph S. Scheuermann and Thomas N. Carter, Chicago, Ill., assignors to Cameron Machine Company, Brooklyn, N. Y., a corporation of New York Application November 16, 1944, Serial No. 563,780

1 Claim. (Cl. 242—75)

This invention relates to machines employing a tensioned running web of flexible material, such as paper or the like, in which machines a carriage, capable of a back-and-forth movement, supports a tension-control roll that engages a bight or loop in the running web.

In such machines it has been customary to employ a power device, consisting of a flexible connection passing over a sheave and carrying weights at its free end, as a means for exerting a constant pull on the carriage, to thereby force the tension-control roll with a constant pressure into engagement with the bight in the web.

Such weights are cumbersome and heavy to handle when it is desired to change from one constant pressure of the tension-control roll against the web to another constant pressure of said roll. Moreover, if the web should suddenly become greatly slackened or break, the consequent sudden descent of the weights could be quite disastrous to the attendants at the machine as well as to the machine itself.

The main object and feature of this invention is to provide a power device, for the carriage that supports the tension-control roll, operated and controlled by fluid-pressure, preferably air pressure, whereby the objectionable weights can be dispensed with.

In the accompanying drawings, the invention is disclosed in several concrete and preferred forms, in which:

Fig. 1 is a somewhat diagrammatic view in side elevation showing one form of the invention applied to two types of machines, one, an unwinding mechanism for a web of flexible material and, another, a winding machine for said web;

Fig. 2 is a horizontal sectional detail view substantially on the plane of line 2—2 of Fig. 1;

Fig. 3 is a vertical sectional view substantially on the plane of line 3—3 of Fig. 1;

Fig. 4 is a vertical sectional detail view substantially on the plane of line 4—4 of Fig. 3;

Figure 9:
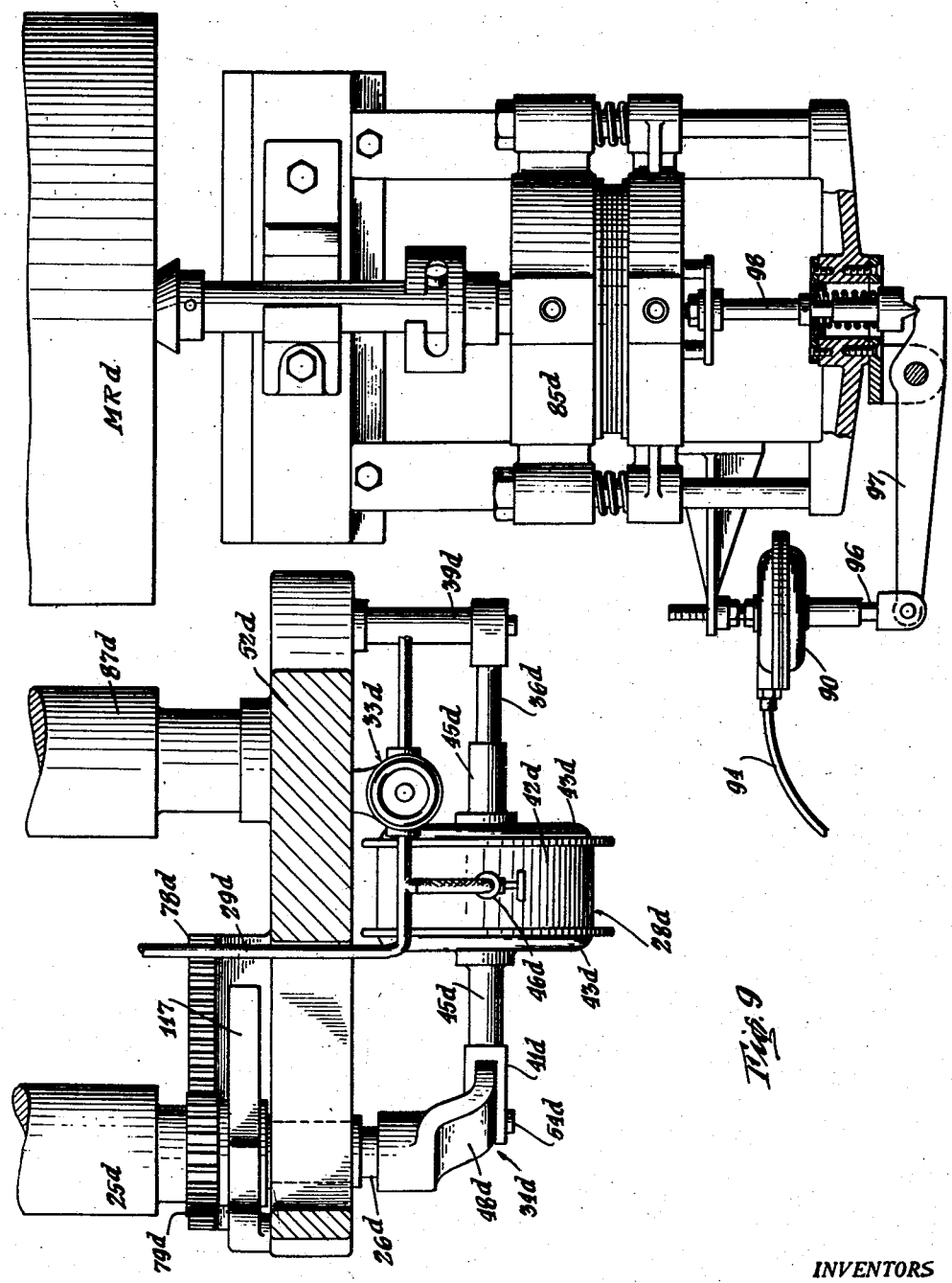
Figure 13:
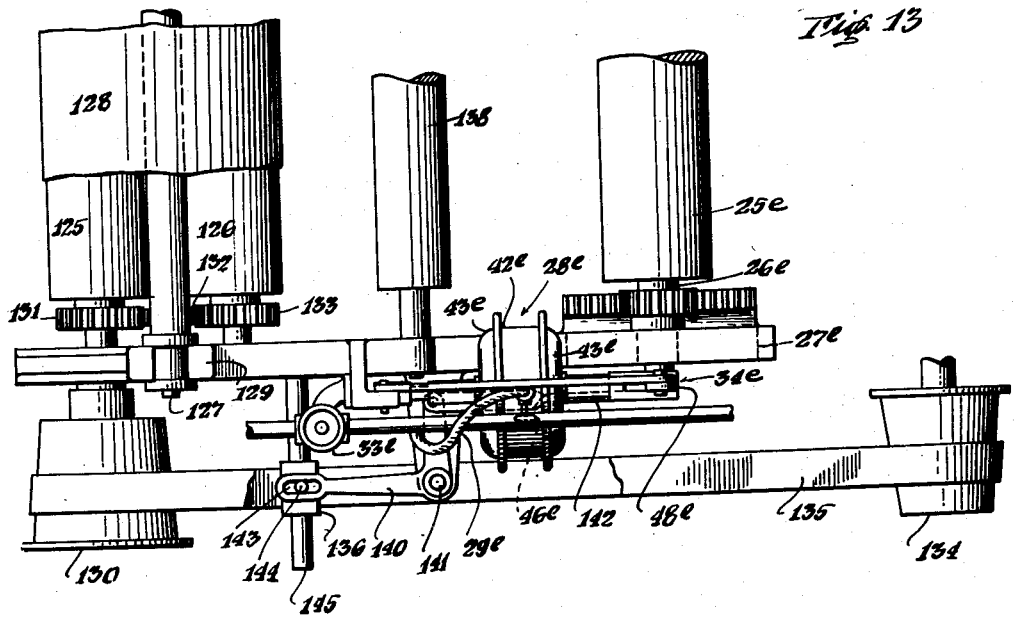
Figure 14:
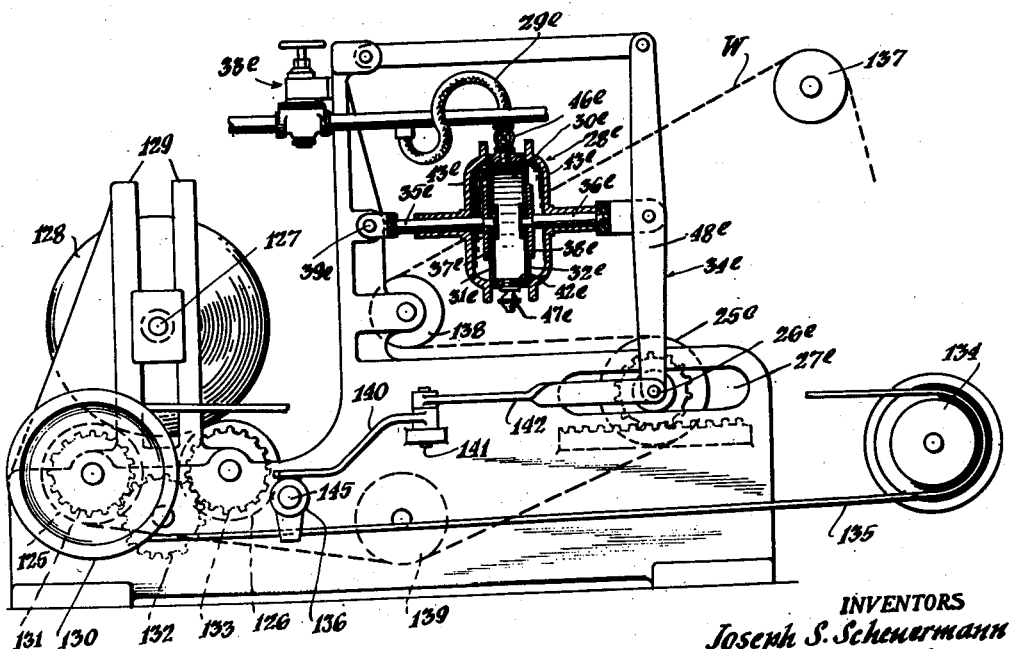

Figs. 5, 6 and 7 are vertical sectional views through a valve-mechanism that may be used in connection with the invention. Fig. 5 shows the position of the parts when they are in equilibrium; Fig. 6 shows the position of the parts when the inlet valve is open and the outlet valve is closed; and Fig. 7 shows the position of the parts when the outlet valve is open and the inlet valve is closed;

Fig. 8 is a view similar to Fig. 1 but showing a modified form of the invention;

Fig. 9 is a horizontal sectional view substantially on the plane of irregular line 9—9 of Fig. 8, showing parts of the unwinding mechanism;

Fig. 10 is a horizontal sectional view substantially on the plane of irregular line 10—10 of Fig. 8, showing parts of the winding machine;

Fig. 11 is a sectional view of one type of fluid-actuated operating device such as may be used either in connection with the brake rod of the brake of the unwinding mechanism of Figs. 8 and 9, or with the clutch rod of the slip-friction drive of the winding machine of Figs. 8 and 10;

Fig. 12 is a vertical sectional view through a valve-mechanism and means for actuating same to be used in connection with the forms of the invention shown in Figs. 8 to 11 inclusive;

Fig. 13 is a fragmentary plan view of Fig. 14 showing still another form of the invention; and Fig. 14 is a view partly in side elevation and partly in section of the parts shown in Fig. 13.

It will facilitate an explanation and understanding of the broad aspects of the invention and of the fluid-pressure power device if attention is first directed to Fig. 4. As there shown, the web under tension is indicated at W, and 25 denotes a tension-control roll rotatably mounted on carriage or shaft 26 and engaging the bight or loop in said web. Carriage 26 is capable of a back-and-forth movement in guide 27 in a well-understood manner. 28 is a fluid-pressure receiver connected by means of a duct 29 to a source of supply of fluid-pressure (not shown). Receiver 28 is provided with an expansible and contractible fluid-pressure receiving chamber such as would be afforded by a cylinder and piston or by a chamber having a flexible diaphragm. In the construction shown, the chamber, indicated by 30, is formed between two flexible diaphragms, 31 and 32, for reasons that will presently appear, so that the chamber takes on the character of bellows. 33 indicates valve-mechanism, interposed in duct 29, and it will be sufficient for immediate purposes to state that the function of said valve-mechanism is to maintain the same predetermined fluid-pressure within chamber 30, notwithstanding the expansion or contraction of said chamber; the details of construction of said valve-mechanism 33 will be described later. Suitable power-transmission and connecting means, here generally indicated by the reference character 34, responsive to fluid-pressure in chamber 30 and to the tension of the web against roll 25, are provided, also to be presently described.

From the foregoing it will now be understood that, when a slack develops in the bight of web W, carriage 26 and thereby roll 25 will move to the right (in Fig. 4) under compulsion of fluid-pressure in chamber 30. This will expand chamber 30 and will therefore tend to diminish fluid-pressure within said chamber, the immediate effect of which will be to cause valve-mechanism 33 to supply fluid-pressure to chamber 30 to thereby maintain the same predetermined pressure, as previously existed, of roll 25 against the web. When valve-mechanism 33 has established the predetermined fluid-pressure in chamber 30, it will automatically shut itself off. Conversely, when the tension of web W becomes excessive, roll 25 and thereby carriage 26 will move to the left (in Fig. 4), thereby contracting chamber 30. This will therefore tend to increase the fluid-pressure within chamber 30, the immediate effect of which will be to cause valve-mechanism 33 to exhaust fluid-pressure from chamber 30, to thereby maintain the same predetermined pressure, as previously existed, of roll 25 against the web. When valve-mechanism 33 has established the predetermined fluid-pressure in chamber 30, it will automatically close the exhaust.

A general understanding of the construction and operation of the invention having now been obtained, a more detailed description will be given.

Referring again to Fig. 4 and receiver 28, means are provided to translate simultaneous opposite movements of diaphragms 31 and 32 into a unidirectional movement of power-transmission and connecting means 34 which, in the present instance, take the following form: 35 and 36 indicate two axially alined shafts, to slidably sustain receiver 28, extending into said receiver from opposite sides thereof. One shaft 35 is connected to the central portion of diaphragm 31 by means of clamping discs 37, and the other shaft 36 is connected to central portion of diaphragm 32 by means of clamping discs 38. Shaft 35 is pivotally supported extraneously of receiver 28 and held against endwise movement by support 39, whereas shaft 36 is connected by connecting means, here consisting of threaded extension 40, to power-transmission member 41, which latter is movably mounted extraneously of receiver 28. Receiver 28 here consists of three members, one central member 42 and two outer members 43, held together by means of bolts 44. Diaphragms 31 and 32 are clamped at their peripheries between members 42 and 43 as shown. Receiver 28 is further provided with sleeve extensions 45 surrounding shafts 35 and 36. 46 is a shut-off valve to close communication from duct 29 to chamber 30, and 47 is a drain valve from said chamber 30. Forming part of power-transmission means 34, is a rocker-lever 48 pivotally supported at 49 to rocker-bar 50, which latter is pivotally carried on pivot 51 of framework 52. Lever 48 is connected to carriage or shaft 26 as by bushing 53 loosely surrounding said shaft so as to follow, or impart, the back-and-forth movement of shaft 26 without following its rotation, and power-transmission member 41 is connected to lever 48 by pivotal connection 54.

From the foregoing, it will now be seen that the expansion of chamber 30 produced by the simultaneous movement of diaphragms 31 and 32 in opposite directions will cause not only shaft 36 to move to the right (in Fig. 4) but will also produce a sliding movement of receiver 28 and its sleeves 45 to the right (in Fig. 4). By these means the movement of lever 48 (and thereby of carriage 26 and roll 25) will have twice the amplitude that would be produced if but a single diaphragm were used. Conversely, movement of lever 48 to the left (in Fig. 4), when web tension becomes excessive, will cause return to the left (in Fig. 4) of both shaft 36 and receiver 28. Furthermore, as it is desired, in this instance, that the back-and-forth movement of shaft or carriage 26 shall be a straight-line movement, it will be seen that lever 48 which rocks on pivot 49, will move bar 50 up and down by turning it on pivotal center 51. It will also be observed that pivotal connection 54 allows rocking movement of lever 48 while permitting a straight-line movement of shaft 36 and receiver 28.

From the foregoing, it will also be seen that rocker-bar 50 constitutes a floating support for rocker-lever 48, and that shafts 35 and 36 (which are parallel to rocker-bar 50) together with receiver 28 constitute floating means that are pivotally connected to rocker-lever 48 at an intermediate point thereof. To allow rocking or floating movement of receiver 28, part of duct 29 will be flexible as shown.

Attention is now directed to Figs. 5, 6 and 7 for a full explanation of valve-mechanism 33.

The casing of valve-mechanism 33 is divided into a high-pressure chamber 55, connected to the source of supply of fluid-pressure (not shown), and a low-pressure chamber 56 connected to receiver 28. 57 is an inlet valve to open or close port 58 between the high and low-pressure chambers, said inlet valve being urged into its closed position by spring 59. 60 is an outlet valve to open or close port or exhaust 61. Valves 57 and 60 are connected by means of a valve stem 62 so as to move in unison. 63 is a movable valve seat, having port 61, associated with said outlet valve 60. 64 and 65 are two controllers, for said valve-mechanism, acting in opposition to each other. One of these, 64, exerts a constant pressure to which it has been adjusted. The other, 65, is a flexible diaphragm, the edges of which are anchored in the casing as shown, which engages movable valve seat 63 within low-pressure chamber 56 of the valve-mechanism and is thus responsive to fluid-pressure in receiver 28. Controller 64 consists here of a stem 66 in threaded engagement with, and adjustable in, guide 67 and bearing against spring seat 68, between which latter and movable valve seat 63, a spring 69 is interposed. Stem 66 is provided with a handle 70 by means of which its position can be adjusted to thereby vary the pressure or tension of spring 69 in opposition to the force exerted by controller 65. Thus the operation of valve-mechanism 33 is controlled by two factors: the predetermined pressure exerted by controller 64, and the fluid-pressure is chamber 30 of receiver 28 acting through controller diaphragm 65. This action will now be described in detail.

When the fluid-pressure in receiver 28 is such as to press control roll 25 into engagement with the web to create therein the desired tension, the force exerted by spring 69 of controller 64 against valve seat 60, and the fluid-pressure exerted against diaphragm controller 65 plus the force of spring 59 on inlet valve 57 will be equalized. The parts of the valve-mechanism will therefore be in the position shown in Fig. 5, and inlet valve 57 and outlet valve 60 will both be in closed position. When chamber 30 of receiver 28 expands, owing to the formation of slack in the web, the fluid-pressure therein tends to diminish. Consequently, the force exerted by controller diaphragm 65 diminishes and is overcome by the force exerted by controller 64. This will cause valve seat 63 to be moved (Fig. 6), carrying with it both outlet valve 60 and inlet valve 57. It will be observed, however, that outlet valve 60 remains in its closed position, although inlet valve 57 is moved to its open position. Fluid under pressure will therefore flow from high-pressure chamber 55 to low-pressure chamber 56 and thence to receiver 28 until the desired predetermined pressure is restored in chamber 30 of receiver 28 when equilibrium is obtained and the parts reassume the position shown in Fig. 5. On the other hand, when the tension of the web becomes excessive against control roll 25, chamber 30 of receiver 28 will contract and the fluid-pressure in chamber 30 will tend to increase. This excessive pressure will be exerted against diaphragm controller 65 and will in turn overcome the action of spring 69 of controller 64. This will move valve seat 63 away from outlet valve 60 and port or exhaust 61 will be open while inlet port 58 will remain closed (Fig. 7). The result is that fluid-pressure from receiver 28 will be drained back into low-pressure chamber 56 and out through exhaust 61 until pressure has been reduced in chamber 30 of receiver 28 to the predetermined one, thereby enabling spring 69 of controller 64 to close exhaust 61 by moving valve seat 63 against outlet valve 60, whereupon the parts will reassume the position shown in Fig. 5.

It will be understood that the avoidance of time-lag is an important consideration in correcting variations in tension of the web. It has been found that provision can be made in the valve-mechanism to give it what might be called a hair-trigger action. This is accomplished (Fig. 5) by providing a small leak 71 from high-pressure chamber 55 to low-pressure chamber 56, the effect of which is to constantly tend to activate the valve-mechanism without substantially affecting the pressure in chamber 30 of receiver 28. Good results have been obtained with a leak having a diameter of .00175 of an inch. It is, of course, not intended to limit the leak to this particular size, as different machines or operating conditions might require different treatment. To provide for this, there is shown in Fig. 6 an adjustable needle valve 72 controlling leak 71. In some cases, a similar result can be obtained by providing a leak 73 (Fig. 7) from low-pressure chamber 56 to atmosphere, and this leak likewise can be controlled by an adjustable needle valve 74.

Attention is now directed to Figs. 1, 2 and 3, as well as to Figs. 4 to 7. Referring particularly to Fig. 1, A indicates an unwinding mechanism such as a mill roll stand, and B is a winding machine. C is a processing machine such as a printing press which acts on web W in its passage from A to B. It will be understood that it is not necessary to have a battery of machines such as A, B and C in order to practice the invention; the arrangement shown is merely a convenient way of exemplifying that the invention can be embodied in different machines.

Considering first the construction shown in connection with winding machine B, web W passes over guide rollers 75 and 76 between which is interposed tension-control roll 25 to engage the bight in the web. After leaving guide roller 76, the web passes to winding shaft 77 of the winding machine. As previously indicated, tension-control roll 25 is rotatably supported on a carriage, here consisting of shaft 26, capable of a back-and-forth movement in guide 27 (Fig. 2). Adjacent said guide 27 is a stationary rack 78 with which meshes a pinion 79 fast on shaft or carriage 26. The arrangement is in duplicate, there being a guide 27, a rack 78 and a pinion 79 associated with each end of shaft or carriage 26. There is also a receiver 28 and a train of connections, as 34, at each side of the machine and, for this purpose, duct 29 extends to both receivers 28 as shown in Fig. 3, but only one valve-mechanism 33 is needed to control both receivers 28.

Winding machine B is of the center-wind type, i. e. winding shaft 77 is driven by power applied centrally of said shaft. As the wound material, WM, accumulates on said winding shaft, it will be understood that a greater and greater length of material is taken up with each revolution of said shaft; hence, it is necessary to decrease the speed of said shaft as the winding operation proceeds. Also, the power necessary to drive said winding shaft 77 will, at the beginning of the winding operation, be slight but, as the load on said shaft increases, due to the accumulation of wound material thereon, more and more power is required to drive the shaft if the right web tension is to be maintained. It is therefore customary to employ means to drive winding shaft 77 consisting in part of a variable speed mechanism such as a slip-friction drive or clutch 80 that at first engages lightly and without any, or very little, slippage but which, as the load increases, engages more strongly and has greater slippage.

It has been pointed out that carriage 26 is capable of a back-and-forth movement but, in the winding machine here under consideration, it is also necessary to have a progressive movement or a movement of traverse of said carriage 26 from near one end of guide 27 to a point adjacent the other end of said guide in order to actuate a clutch-control rod, such as 81, to increase the action of clutch 80 as the winding operation proceeds. The action of carriage 26 is therefore a gradual movement of traverse from one end of guide 27 to the other, interrupted by slight back-and-forth movements to compensate for temporary variations in tension of the web. It will further be understood that, in response to the movement of traverse of carriage 26, chamber 30 of receiver 28 will be gradually expanded and that, notwithstanding such expansion, the same fluid-pressure will be maintained within said chamber 30. The means for actuating clutch-control rod 81 from carriage 26 here consist of link 82 connected at one end to lever 48 and at its other end to lever 83 pivoted at 84 on framework 52, said clutch-control rod 81 being pivotally connected to lever 83.

Turning now to unwinding mechanism A, it will be understood that a condition there prevails which is the reverse of that in winding machine B, for there, at the beginning of the unwinding operation, mill roll MR is at its greatest diameter and must therefore be rotated slowly at first, the speed of the mill roll increasing as its diameter diminishes in order to supply the same length of web in a given time. It is customary to provide the mill roll with a variable-speed mechanism, here a variable brake 85, controlled by a brake-rod 86. Web W, as it unwinds, passes over guide rolls 87 and 88 between which is interposed tension-control roll 25a mounted on carriage 26a capable of a back-and-forth movement in guide 27a and connected to receiver 28a by means of connections 34a. A duct 29a leads from a source of supply of fluid-pressure (not shown) to receiver 28a and interposed in said duct is valve-mechanism 33a. All these parts are constructed and arranged as previously described, and an exponent has merely been added to the numeral for the purpose of identification and to avoid needless repetition. Brake-rod 86 is here operatively connected to lever 48a by means of rod 89 so that traverse of carriage 26a will be transmitted to the brake to gradually release it as the unwinding proceeds. Owing to the fact that the brake is applied most strongly at the beginning of the unwinding operation and thereafter decreases in effectiveness, chamber 30, within receiver 28a, will be substantially fully expanded at the beginning of said unwinding operation and will be gradually contracted during the traverse of carriage 26a from one end to the other of guide 27a. The progressive traverse of said carriage 26a will nonetheless be interrupted by slight back-and-forth movements to compensate for temporary variations in tension of the web. However, valve-mechanism 33a will maintain a constant fluid-pressure in chamber 30 of receiver 28a during the gradual contraction of said chamber 30 as well as during temporary expansion or contraction thereof.

In Figs. 1, 2 and 3, the connecting means between carriage 26 or 26a and slip-friction clutch 80 or brake 85 are shown as being wholly mechanical connections. Such means can take other forms.

Attention is now directed to Figs. 8 to 12 inclusive, in which fluid-pressure connections, to a large extent, take the place of the mechanical connections.

In Fig. 8 is shown a view of a battery of machines similar to Fig. 1. A1 indicates an unwinding mechanism, B1 a winding machine and C1 an intermediate processing machine. So far as the elements included in the power device associated with the tension control are concerned, they are, in Figs. 8 to 12 inclusive, the same as those described in connection with Figs. 1 to 7 inclusive, and are indicated by the same reference characters but with an added or a different exponent. Thus, in winding machine B1, receiver 28c, valve-mechanism 33c, duct 29c, carriage 26c, tension-control roll 25c etc. are the same as the corresponding elements of 28, 33, 29, 26, 25 etc. of winding machine B. So, likewise, in unwinding mechanism A1, receiver 28d, valve-mechanism 33d, duct 29d, carriage 26d, tension-control roll 25d etc. are the same as the corresponding elements in unwinding mechanism A. It will therefore be unnecessary to repeat a description of the construction and operation of these parts of the machine.

90, or 91 (Fig. 11), indicates a fluid-actuated operating device, which can be of any suitable construction, but which is here in the form of a casing 92 divided by a flexible diaphragm 93. Connected to said casing at one side of the diaphragm is a duct 94 or 95 leading from a source of supply of fluid-pressure (not shown). Connected to said diaphragm is a slidable member 96 pivotally connected to a pivoted lever 97 that engages, in the case of machine A1, a brake-control rod 98 or, in the case of machine B1, a clutch-control rod 99.

Interposed in duct 94 or 95, is a valve-mechanism 100 or 101, which valve-mechanism (Fig. 12) is here constructed as follows: The valve casing is divided into a high-pressure chamber 102, connected to the source of supply, and a low-pressure chamber 103, connected to fluid-actuated operating device 90 or 91, as the case may be. 104 is an inlet valve to open or close port 105 between the high and low-pressure chambers, said inlet valve being urged into its closed position by spring 106. 107 is an outlet valve to open or close port or exhaust 108. Valves 104 and 107 are connected by means of a valve stem 109 so as to move in unison. 110 is a movable valve seat, having port 108, associated with said outlet valve 107. 111 and 112 are two controllers, for said valve-mechanism, acting in opposition to each other. One of these, 111, moves in response to movements of carriage 26d or 26c. The other, 112, is a flexible diaphragm, the edges of which are anchored in the casing as shown, which engages movable valve seat 110 within low-pressure chamber 103 of the valve-mechanism and is thus responsive to fluid-pressure in fluid-actuated operating device 90 or 91, as the case may be. Controller 111 consists here of a plunger 113 movable in guide 114 and bearing against spring seat 115, between which latter and movable valve seat 110, a spring 116 is interposed. The means for operating controller 111 from reciprocatory carriage 26d or 26c, as the case may be, consists of a cam lever 117 or 118 pivoted at 119 or 120 on the framework. The free end of cam lever 117 or 118 rests with its cam face on tension-control roll 25d or 25c or other member of carriage 26d or 26c, so that movements of said carriage will lift or lower the cam lever. Plunger 113 of controller 111 engages the upper surface of the cam lever and it will be apparent that said plunger will be moved up or down in conformity with the movements of said cam lever, whereby the tension of spring 116 will be varied.

When the fluid-pressure in fluid-actuated operating device 90 or 91 is such as to operate the variable speed-control device (brake 85d or clutch 80c) to give the required constant web tension in any position of carriage 26d or 26c, the force exerted by spring 116 of controller 111 against valve seat 110, and the fluid-pressure exerted against diaphragm controller 112 plus the force of spring 106 on inlet valve 104 will be equalized. The parts of the valve-mechanism will therefore be in a position where inlet valve 104 and outlet valve 107 will both be closed. If the force exerted by the fluid-pressure in fluid-actuated operating device 90 or 91 is insufficient to properly actuate brake 85d or clutch 80c to maintain the constant tension on the web, then the movement of carriage 26d or 26c will, through the connections described, actuate plunger 113 of controller 111 to increase tension of spring 116 to overcome the force exerted by diaphragm controller 112 and spring 106. This will cause valve seat 110 to be lifted, carrying with it both outlet valve 107 and inlet valve 104. It will be observed, however, that outlet valve 107 remains in its closed position, although inlet valve 104 is moved to its open position. Fluid under pressure will therefore flow from high-pressure chamber 102 to low-pressure chamber 103 and thence to fluid-actuated operating device 90 or 91 until equilibrium is restored and the parts reassume the position shown in Fig. 12. On the other hand, if the fluid-pressure in fluid-actuated operating device 90 or 91 is in excess of that required to properly actuate brake 85d or clutch 80c to maintain the constant tension on the web, then the fluid-pressure acting on diaphragm controller 112 will overcome the action of spring 116 and will move valve seat 110 away from outlet valve 107 and port or exhaust 108 will be open while inlet port 105 remains closed. The result is that fluid-pressure from fluid-actuated operating device 90 or 91 will drain back into low-pressure chamber 103 and out through exhaust 108 until pressure has been reduced to enable spring 116 to close port 108 by moving valve seat 110 against outlet valve 107, whereupon the parts will reassume the position shown in Fig. 12.

In addition to the foregoing, it must again be borne in mind that, at the beginning of the unwinding operation of unwinding mechanism A1, brake 85d will exert its greatest force, and that, at the beginning of the winding operation of winding machine B1, slip-friction clutch 80c will engage with the least force.

To keep valve 100 or 101 activated, in the same manner as that described in connection with valve-mechanism 33, a leak 121 may be provided, from high-pressure chamber 102 to low-pressure chamber 103, and an adjustable valve 122 to control the size of the leak. Or, in certain cases, a leak 123 from low-pressure chamber 103 to atmosphere can be used, and the size of this leak can likewise be regulated by a valve 124.

Valve-mechanism such as 33 (Figs. 5, 6 and 7) and valve such as 100 (Fig. 12) are constructed alike, except that, in case of 33, controller 64 is adjusted to maintain a uniform fluid-pressure in chamber 30 of receiver 28, whereas, in the case of valve 100, the corresponding controller 111 is used to vary the fluid-pressure in fluid-actuated device 90 in accordance with the movement of the carriage that supports the tension-control roll.

The use of a valve such as 100 and associated elements to actuate variable speed-control devices, such as a variable brake or a variable clutch, disclosed in Figs. 8 to 12 inclusive hereof, forms the subject matter of another application filed June 15, 1944, Ser. No. 540,444, now Patent No. 2,462,558 issued February 22, 1949.

Attention is now directed to Figs. 13 and 14 which show the invention applied to a surface-winding machine. A surface-winding machine is one in which the winding of the material is accomplished by means of a winding shaft resting in the valley between two drums. Such machines are well known and it is unnecessary to describe them in detail. Suffice it to say that 125 and 126 indicate two winding drums, and 127 indicates the winding shaft on which wound material 128 is accumulated, and as the material accumulates said winding shaft rises in suitable guides 129 in a well-understood manner. Winding drum 125 is driven by pulley 130, and is provided with a gear 131 that meshes with an intermediate gear 132, which latter in turn drives gear 133 of winding drum 126. Thus the two winding drums, 125 and 126, rotate in the same direction and drive the winding shaft by frictional engagement with the surface of the material being wound. It will be apparent that the winding drums will be driven at a constant speed, except to compensate for minor variations in tension of the running web so that, if the web slackens, the speed of the winding drums will be slightly increased and, if the tension in the running web becomes excessive, the speed of the winding drums will be slightly decreased.

In the present instance, pulley 130 is a cone pulley and derives its motion from another cone pulley 134 by means of belt 135 and it will be understood that, by means of a belt-shifter 136, the speed of winding drums 125 and 126 can be varied, so that the parts described constitute a variable speed-control device.

The incoming running web W passes over guide 137, and thence around guide rollers 138 and 139, after which it travels around winding drum 125 to winding shaft 127. Intermediate the guide rollers, 138 and 139, is interposed a tension-control roll 25e mounted on a shaft or carriage 26e, which latter is capable of a back-and-forth movement in guide 27e. Tension-control roll 25e engages a bight or loop in the running web against which it is pressed by a group of devices similar in construction to those described in connection with the other forms of the invention. That is to say: 28e is a receiver constructed and mounted receiver 28 of Fig. 4 and having an expansible and contractible chamber 30e like chamber 30 of Fig. 4, to which is connected a duct 29e leading from a source of supply of fluid-pressure (not shown). So, likewise, 33e indicates a valve-mechanism like 33 of Fig. 5, and power-transmitting means 34e, including a lever 48e, are likewise employed to connect receiver 28e to carriage 26e, and all these parts readily identify themselves.

In this instance, however, it will be observed that there is no traverse of carriage 26e from one end of guide 27e to the other during the winding operation, because no slip-friction clutch is employed, the clutching power of which latter would have to be progressively increased, and because the speed of winding drums 125 and 126 remains constant, except to be varied slightly to take up slack or relieve tension. Consequently, the parts are so adjusted that, when the web is at the right tension, chamber 30e will be approximately halfway expanded, and variations from such central position will compensate for undesired slack or undue tension. So, also, carriage 26e will, under proper tension conditions, occupy substantially a mid-position in guide 27e, and will reciprocate back and forth from that position to keep it in proper engagement with the bight in the web.

Any suitable means, either fluid-pressure or mechanical, can be utilized to transmit the back-and-forth movement of carriage 26e to belt-shifter 136. In the present instance, a bell-crank 140 is pivotally supported at 141 on the framework, one end of said bell-crank being connected to carriage 26e by link 142, and the other end of said bell-crank having a slot 143 engaging a pin 144 on belt-shifter fork 136, which latter slides on stationary guide 145.

We claim:

In a machine employing a tensioned running web of flexible material, which machine has tension-control means including a reciprocatory carriage that moves in a straight guide and is provided with a roll that engages a bight in said running web, the combination with said carriage; of a rocker-lever pivotally mounted at one end and pivotally connected at the other end to said carriage; a rocker-bar pivotally supporting said first-mentioned end of said rocker-lever; and a power device including: two axially alined shafts parallel to said rocker-bar, a pivotal support for one of said shafts, pivotal connecting means between said other shaft and said rocker-lever at an intermediate point of the latter, and means mounted on said shafts to effect lengthwise movement of said other shaft.

JOSEPH S. SCHEUERMANN.
THOMAS N. CARTER.

REFERENCES CITED

The following references are of record in the file of this patent:

UNITED STATES PATENTS

| Number | Name | Date |
| --- | --- | --- |
| 1,100,039 | Tyler et al. | June 16, 1914 |
| 1,860,962 | Smith | May 31, 1932 |
| 1,887,578 | Bush | Nov. 15, 1932 |
| 1,936,602 | Karg | Nov. 28, 1933 |
| 2,252,152 | Work | Aug. 12, 1941 |
| 2,320,191 | Mott | May 25, 1943 |
| 2,331,765 | Carter | Oct. 12, 1943 |